US008489326B1

(12) United States Patent
Na et al.

(10) Patent No.: US 8,489,326 B1
(45) Date of Patent: Jul. 16, 2013

(54) PLACEMARKED BASED NAVIGATION AND AD AUCTION BASED ON PLACEMARKS

(75) Inventors: Piaw Na, Sunnyvale, CA (US); Jonathan Siegel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 429 days.

(21) Appl. No.: 12/702,855

(22) Filed: Feb. 9, 2010

(51) Int. Cl.
*G01C 21/34* (2006.01)

(52) U.S. Cl.
USPC ............. 701/426; 701/400; 701/25; 701/425; 701/428; 705/14.19

(58) Field of Classification Search
USPC ..... 701/23–25, 400, 425–426, 431; 705/14.1, 705/14.13, 14.14, 14.19, 5, 22
See application file for complete search history.

(56) References Cited

U.S. PATENT DOCUMENTS

| | | | | |
|---|---|---|---|---|
| 6,477,460 | B2 * | 11/2002 | Kepler | 701/426 |
| 8,108,141 | B2 * | 1/2012 | Ehrlacher | 701/416 |
| 2008/0046174 | A1 * | 2/2008 | Johnson | 701/209 |
| 2008/0262717 | A1 * | 10/2008 | Ettinger | 701/206 |
| 2009/0063045 | A1 * | 3/2009 | Figueroa et al. | 701/210 |
| 2009/0157540 | A1 * | 6/2009 | Black et al. | 705/37 |
| 2010/0057347 | A1 * | 3/2010 | Sugiyama et al. | 701/204 |
| 2010/0332300 | A1 * | 12/2010 | Swatzell | 705/14.7 |
| 2011/0145089 | A1 * | 6/2011 | Khunger et al. | 705/26.4 |
| 2011/0208429 | A1 * | 8/2011 | Zheng et al. | 701/209 |
| 2011/0288737 | A1 * | 11/2011 | Carr | 701/99 |

FOREIGN PATENT DOCUMENTS

| | | |
|---|---|---|
| WO | 2007 008809 A2 | 1/2007 |
| WO | 2007 044975 A2 | 4/2007 |

OTHER PUBLICATIONS

Gary E. Burnett, "Turn at the King's Head" Drivers' Requirements for Route Guidance Information, A Doctoral Thesis, Nov. 1998, 341 pages.

Dr. Gary Burnett, "Turn Right at the Traffic Light" The Requirements for Landmarks in Vehicle Navigation Systems, The Journal of Navigation, 2000, 1-15, 53(3).

* cited by examiner

*Primary Examiner* — Nicole Verley
(74) *Attorney, Agent, or Firm* — McDermott Will & Emery LLP

(57) ABSTRACT

A system and method provides turn-by-turn directions including placemarks. Each placemark represents a geographically located object such as a business or landmark. A client device may transmit an initial and a final location. Upon receipt of the locations, a server may determine a route comprised of a plurality of route segments. For each route segment associated with one or more placemark, the server may conduct an auction to choose one of the placemarks. The server may receive a plurality of bids associated with a particular route segment. Each bid is associated with a particular placemark. The server selects the placemark by determining a highest bid or other auction criteria. The selected placemark is associated with the route segment and is used to generate a turn-by-turn direction for the route segment, where information associated with the placemark is displayed on a client device.

23 Claims, 10 Drawing Sheets

US 8,489,326 B1

PLACEMARKED BASED NAVIGATION AND AD AUCTION BASED ON PLACEMARKS

BACKGROUND OF THE INVENTION

In targeted advertising, advertisers attempt to provide information to a specific audience. That is, to other individuals or businesses most likely to purchase or invest in the advertised product or service.

Systems heretofore have selected and displayed advertisements based on information received from user devices. Online marketing models use keywords to target users interested in a particular topic. For example, a user searching for "pizza" is likely to be interested in a pizzeria or Italian restaurant. In that regard, advertisers are able to bid on search terms to have the advertiser's information displayed to users most likely to be interested in the advertiser's products or services.

Location based advertising may also be used in conjunction with navigation systems which provide users with turn-by-turn directions. These systems include handheld GPS devices or mobile phones, vehicle-mounted devices, or Internet-based computers with access to websites such as Google Maps. Users input one or more locations and receive a route and turn-by-turn directions based on the order of inputted locations. The turn-by-turn directions may provide contextual descriptions such as street names to help the user follow the directions. For example, a direction may read "turn right onto Main Street in 1 mile." The user may follow the turn-by-turn directions to reach the one or more locations.

In some locations, the turn-by-turn direction may not include a road associated with a street name. For example, dirt roads, highway exit ramps, or service roads may be mapped but not named. Thus, it becomes difficult to include contextual descriptions for such locations.

BRIEF SUMMARY OF THE INVENTION

An aspect of the invention provides a method of providing turn-by-turn directions to a client device on a network. The method includes receiving, by a server, a request for turn-by-turn directions, the request including a first location and a second location; identifying a route between the first location and the second location, wherein the route is comprised of a plurality of route segments; identifying a particular route segment of the plurality of route segments; receiving a plurality of bids associated with the particular route segment, each bid of the plurality of bids being associated with a placemark which identifies a geographic location and being further associated with a temporal requirement; selecting a placemark based on the plurality of bids and the associated temporal requirements; assigning the selected placemark to the particular route segment; generating a turn-by-turn direction based on the placemark associated with the highest received bid; and transmitting the turn-by-turn direction to a client device.

In an example, the first location is a current location of the client device.

In an example, identifying a particular route segment includes receiving a current location of the client device.

In an example, each received bid is associated with a user and each user is associated with a budget, and the method also includes identifying a first user associated with the selected placemark; and reducing the budget associated with the first user based on at least one of the plurality of received bids. In one alternative, the budget is reduced by the highest received bid. In another alternative, the budget is reduced by a bid which is less than the highest received bid.

In an example, the method also includes identifying content associated with the placemark associated with the highest received bid and transmitting the content with the turn-by-turn direction. In an alternative, the content is information associated with a business. In another alternative, the content is a coupon.

In an example, the selected placemark is further associated with a business.

In an example, the temporal requirement associated with the selected placemark is a predefined time period.

In an example, the temporal requirement associated with the selected placemark is a specified day of the week.

In an example, the temporal requirement associated with the selected placemark is based on operating hours of a business associated with the selected placemark.

In an example, the temporal requirement associated with the selected placemark is based on user information received from a user of the client device. In an alternative, the user information is calendar information. In another alternative, the user information is a type of vehicle and the selected placemark is associated with fuel, the method further including identifying an estimated fuel efficiency and identifying a route segment based the type of vehicle and estimated fuel efficiency.

In an example, the route between the first location and the second location is associated with an estimated travel time and wherein selection of the placemark is further based on the estimated travel time.

An aspect of the invention provides a device for providing turn-by-turn directions to a client device over a network. The device includes a processor and memory coupled to the processor. The memory includes a first part for storing the instructions and a second part for storing turn-by-turn directions. The processor is configured to receive a request for turn-by-turn directions including a first location and a second location; identify a route between the first location and the second location, the route being comprised of a plurality of route segments; identify a particular route segment of the plurality of route segments; receive a plurality of bids associated with the particular route segment, each bid of the plurality of bids being associated with a placemark which identifies a geographic location and being further associated with a temporal requirement; select a placemark based on the plurality of bids and the associated temporal requirements; generate a turn-by-turn direction based on the placemark associated with the highest received bid; and transmit the turn-by-turn direction to a client device.

In an example, the temporal requirement associated with the selected placemark is a predefined time period.

In an example, the temporal requirement associated with the selected placemark is a specified day of the week.

In an example, the temporal requirement associated with the selected placemark is based on operating hours of a business associated with the selected placemark.

In an example, the temporal requirement associated with the selected placemark is based on user information received from a user of the client device.

An aspect of the invention provides a device for displaying turn-by-turn directions. The device includes a processor; a user input apparatus for providing data to the processor; and a display for displaying data processed by the processor in accordance with instructions. The processor is configured to transmit, to a server on a network, a request for turn-by-turn directions, the request identifying a first location and a second location; transmit, to the server, user information stored in the memory of the device; receive, from the server, a route between the first location and the second location, a turn by turn direction, and a placemark selected from a plurality of placemarks, wherein the placemark is selected based on the transmitted user information; and display the turn-by-turn direction and the placemark on the electronic display.

In an example, the user information is calendar information.

In an example, the user information is a type of vehicle and the received placemark is associated with fuel.

In an example, the device further includes a geographic location instrument, and the received placemark is associated with a geographic location proximate to a current location of the device. The processor is also configured to determine the current location of the device based on the geographic location instrument; and transmit the current location of the device to the server.

DETAILED DESCRIPTION

Figure 1:
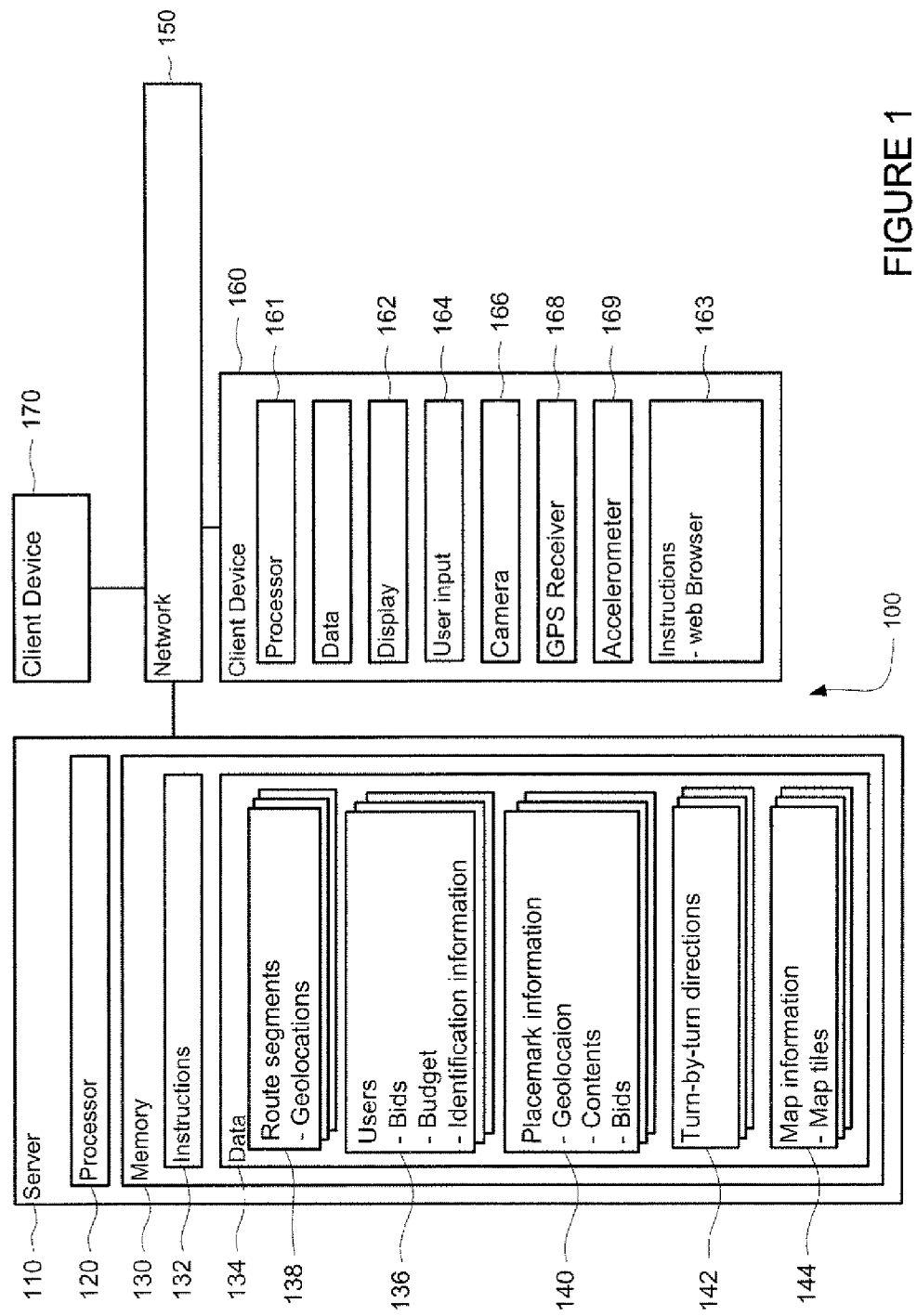
FIG. 1 is a functional diagram of a system in accordance with an aspect of the invention.
Figure 2:
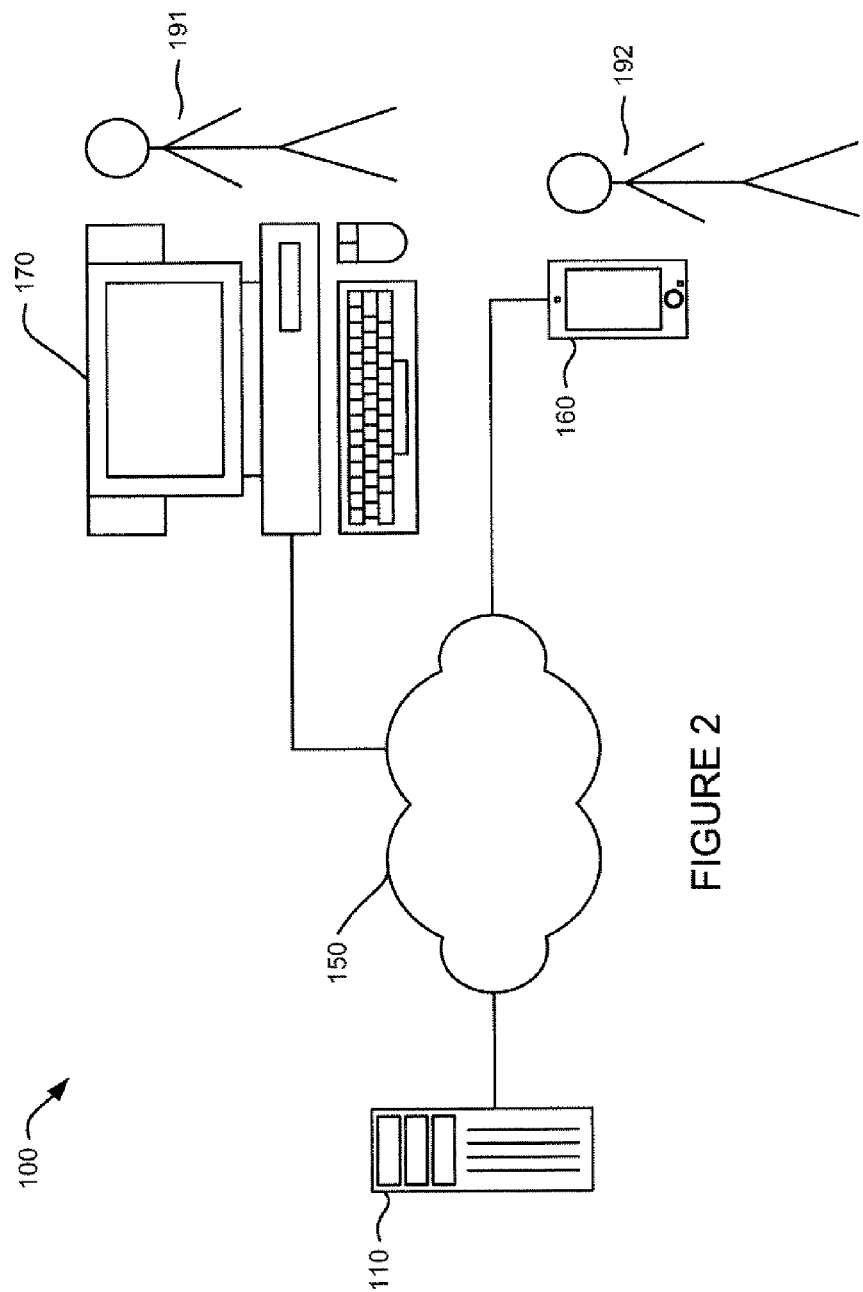
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly communicating with other nodes of the network. For example, computer 110 may comprise a web server that is capable of communicating with client devices 160 and 170 via network 150 such that server 110 uses network 150 to transmit and display information to a user, such as person 191 or 192 of FIG. 2, on display 162 of client device 160. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor 161, memory and instructions 163. Each client device 160 or 170 may be a device intended for use by a person 191-192, and have all of the components normally used in connection with a computer such as a central processing unit (CPU), memory (e.g., RAM and internal hard drives) storing data and instructions such as a web browser, an electronic display 162 (e.g., a monitor having a screen, a small LCD touch-screen, a projector, a television, a computer printer or any other electrical device that is operable to display information), and user input 164 (e.g., a mouse, keyboard, touch-screen and/or microphone). The client device may also include a camera 166, GPS receiver 168, speakers, a network interface device, as well as all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 170 may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA). Indeed, client devices in accordance with the systems and methods described herein may comprise any device capable of processing instructions and transmitting data to and from humans and other computers including general purpose devices, network computers lacking local storage capability, and set-top boxes for televisions.

The client devices may also include a geographic position component to determine the geographic location and orientation of the device. For example, client device 171 may include a GPS receiver 168 to determine the device's latitude, longitude and/or altitude position. The geographic position component may also comprise software for determining the position of the device based on other signals received at the client device 160, such as signals received at a cell phone's antenna from one or more cellular towers if the client device is a cell phone. It may also include an accelerometer, gyroscope or other acceleration device 169 to determine the direction in which the device is oriented. By way of example only, the acceleration device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both.

Although certain advantages are obtained when information is transmitted or received as noted above, aspects of the invention are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

Returning to FIG. 1, user data 136 identifies users of the systems, i.e., any entity that interacts with the system and method such as businesses or people. For example, one user may be the owner or administrator of a restaurant named "Joe's Pizza". As will be described in more detail below, user data 136 may also include bidding information such as budgets and bid values.

Data 134 may include route segments 138. Each route segment may be associated with one or more geographical locations. A given route between locations may comprise a plurality of route segments. By way of example only route segments may be based on stretches of road between intersections, changes in road names, or on turn instructions for the particular determined route. For example, if the route between location A and location C requires a turn at location B, the route consists of two route segments, the segment A-B and the segment B-C. Each segment may be associated with one or more turn-by-turn directions.

The server 110 may also access placemark information 140 identifying local businesses, clubs, or other objects or features associated with particular geographic locations. For example, a placemark may be associated with a name (such as a company name) or a description of the placemark (such as "fountain"). Each placemark may also be associated with one or more route segments, bid information, and content such as coupons, advertisements, user reviews, photos, or menus.

Placemarks may refer to other geographically-located objects in addition to or instead of businesses. For example, they may also include points of interest ("POI"), individuals' homes, landmarks, roads, bodies of land or water, items located in a store, items that can be moved to different locations etc. Therefore, while many of the examples below refer to businesses, most aspects of the system and method are not limited to any particular type of placemark.

The system may also include direction data 142 for generating turn-by-turn directions based on a plurality of route segments. Turn-by-turn directions may include text, audio, video, images, and maps. Each turn-by-turn direction and associated route segment may be further associated with one or more map tiles such that each turn-by-turn directions displayed with the one or more map tiles. It will be understood that turn-by-turn directions are not limited to instructions to make simple turns, for example, other directions may include continuing on a road, taking a particular exit, etc.

Server 110 may store map-related information 144, at least a portion of which may be transmitted to a client device. For example and as shown in FIG. 1, the server may store map tiles, where each tile comprises a map image of a particular geographic area. A single tile may cover an entire region such as a state in relatively little detail and another tile may cover just a few streets in high detail. In that regard, a single geographic point may be associated with multiple tiles, and a tile may be selected for transmission based on the desired level of zoom. The map information is not limited to any particular format. For example, the images may comprise street maps, satellite images, or a combination of these, and may be stored as vectors (particularly with respect to street maps), bitmaps (particularly with respect to satellite images), or flat files.

The various map tiles are each associated with geographical locations, such that the server 110 and/or client device are capable of selecting, retrieving, transmitting, or displaying one or more tiles in response to receiving one or more geographical locations.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing. Locations may be further translated from one reference system to another. For example, the client 160 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, it will be understood that exchanging or processing locations expressed in one reference system, such as street addresses, may also be received or processed in other references systems as well.

Figure 3A:
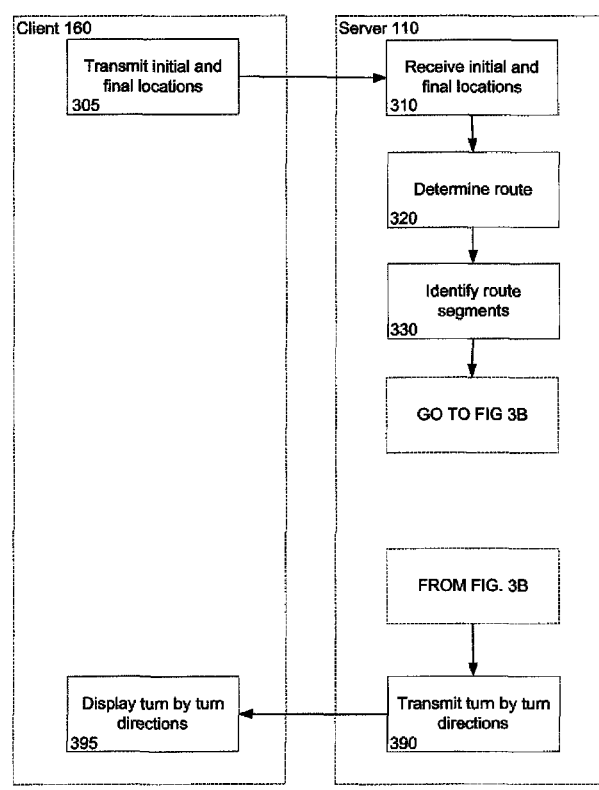
FIGS. 3A and 3B are a flow chart in accordance with an aspect of the invention.
Figure 3B:
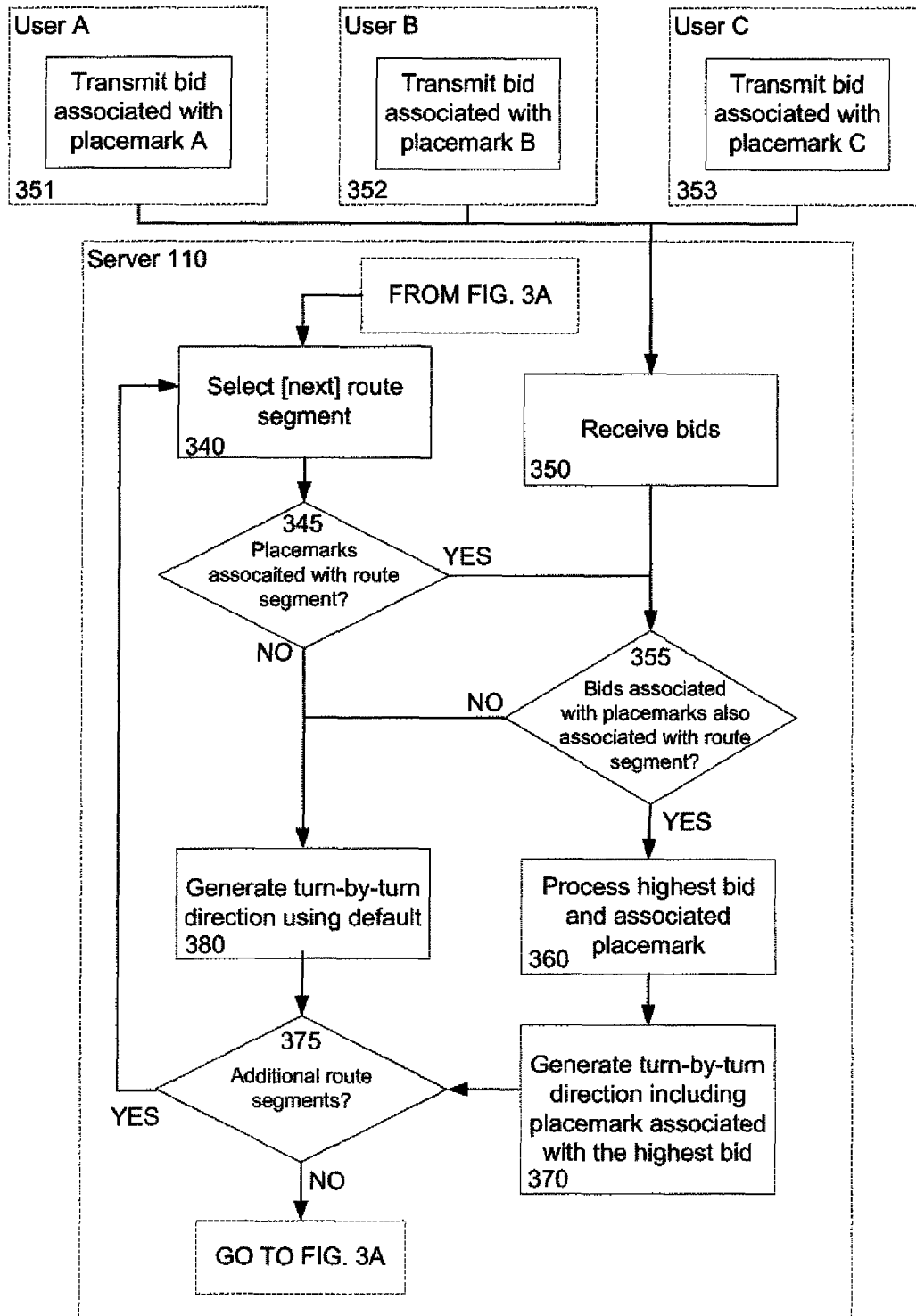

FIGS. 3A and 3B depict an embodiment which will be described in detail below. It will be understood that the operations do not have to be performed in the precise order described below. Rather, various steps can be handled in a different order or simultaneously. For example, as shown in block 305 of FIG. 3A, a client device, such as client device 160, may transmit initial and final locations. Then, at block 310, a server, such as server 110 may receive the initial and final locations and determine a route between the locations as shown in block 320. At block 330, server 110 may identify route segments associated with the route.

Turning to FIG. 3B, server 110 may select a route segment as shown in block 340. Then, at block 345, the server may determine whether there are placemarks associated with the selected route segment. If there are such placemarks, the server will determine whether there are received bids at block 355.

Bids may be transmitted from a plurality of users, such as users A, B, and C of blocks 351-53. Each bid may be associated with a particular placemark. Server 110 may receive the bids at block 350 and use this information to determine whether there are bids associated with the route segment.

If there are bids associated with the route segment, server 110 may process, as described below, the highest bid associated with the placemark at block 360. Then, server 110 may generate a turn-by-turn direction for the route segment including the placemark associated with the highest bid as shown in block 370.

If there are additional route segments, as shown in block 375, the server will return to block 340 and select the next route segment of the route. If there is a placemark associated with the route segment, but no bids associated with the placemark, the server may generate a turn-by-turn direction using a default as shown in blocks 345, 355, and 380. If there are no placemarks associated with the route segment, the server may generate a turn-by-turn direction using the default as shown in block 345 and 380.

If there are no additional route segments at block 370, sever 110 may transmit all of the generated turn-by-turn directions as shown in block 390. Then as shown in block 395, client device 160 may display the turn-by-turn directions.

Figure 4:
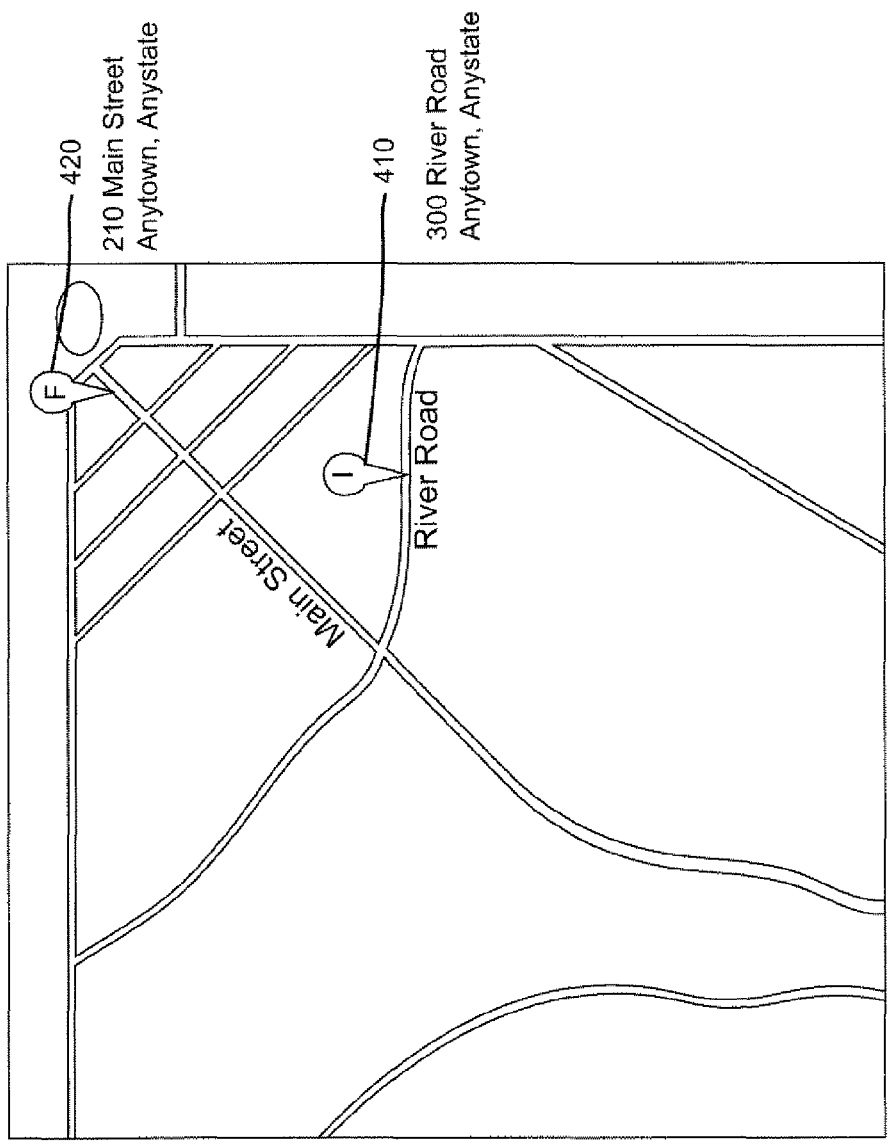
FIG. 4 is a functional diagram of information in accordance with an aspect of the invention.

Aspects of the invention will now be described in greater detail. As noted above, a client device may transmit a request for turn-by-turn directions between two or more locations. For example, as shown in FIG. 4, a user may identify an initial location 410 and a final location 420, or, in another example, the user may identify a final location and the client device may determine the initial location, for example GPS coordinates. As noted above, locations may be provided in any number of forms including street addresses, points of interest, or GPS coordinates of the user device.

Figure 5:
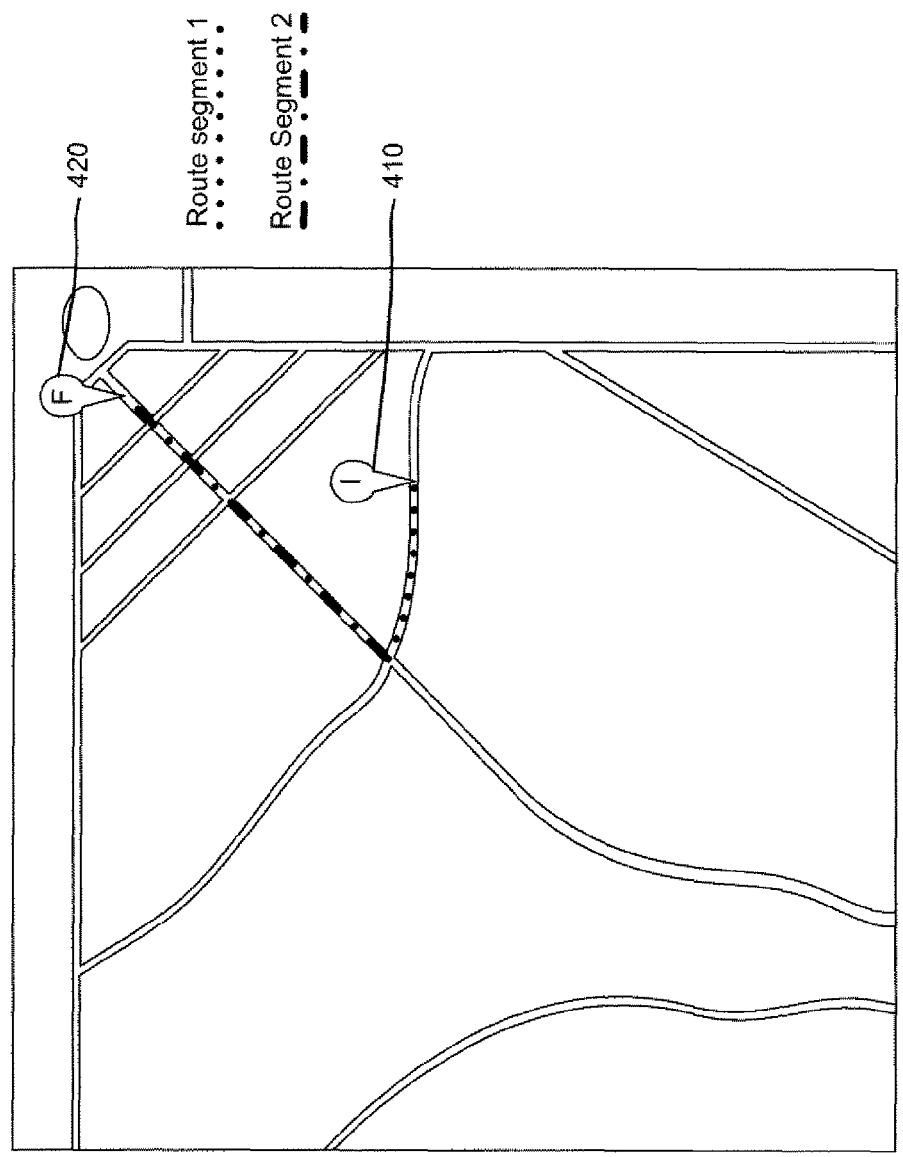
FIG. 5 is a functional diagram of information in accordance with an aspect of the invention.

In response to receiving the locations, a server may determine a route between the received locations. The route may be based on the shortest path, for example, driving or walking distance, time, traffic conditions, or other variables. As shown in FIG. 5, the route may include one or more route segments such as route segment 1 and route segment 2. The number of route segments may correspond to the number of turn-by-turn directions.

Based on the route segments, server 110 may select placemarks associated with the route segments. Selection of placemarks may be determined by auction. It will be understood that in addition to the methods described below, any known auction or other selection method may be used.

In one example, bidding may be performed in advance of the request for turn-by-turn directions. The server may receive a plurality of bids each associated with a placemark. Returning to FIG. 3B, user devices A, B, and C may send various bid information to server 110. Each user may be associated with a particular placemark, and each placemark may be associated with one or more route segments.

Figure 6:
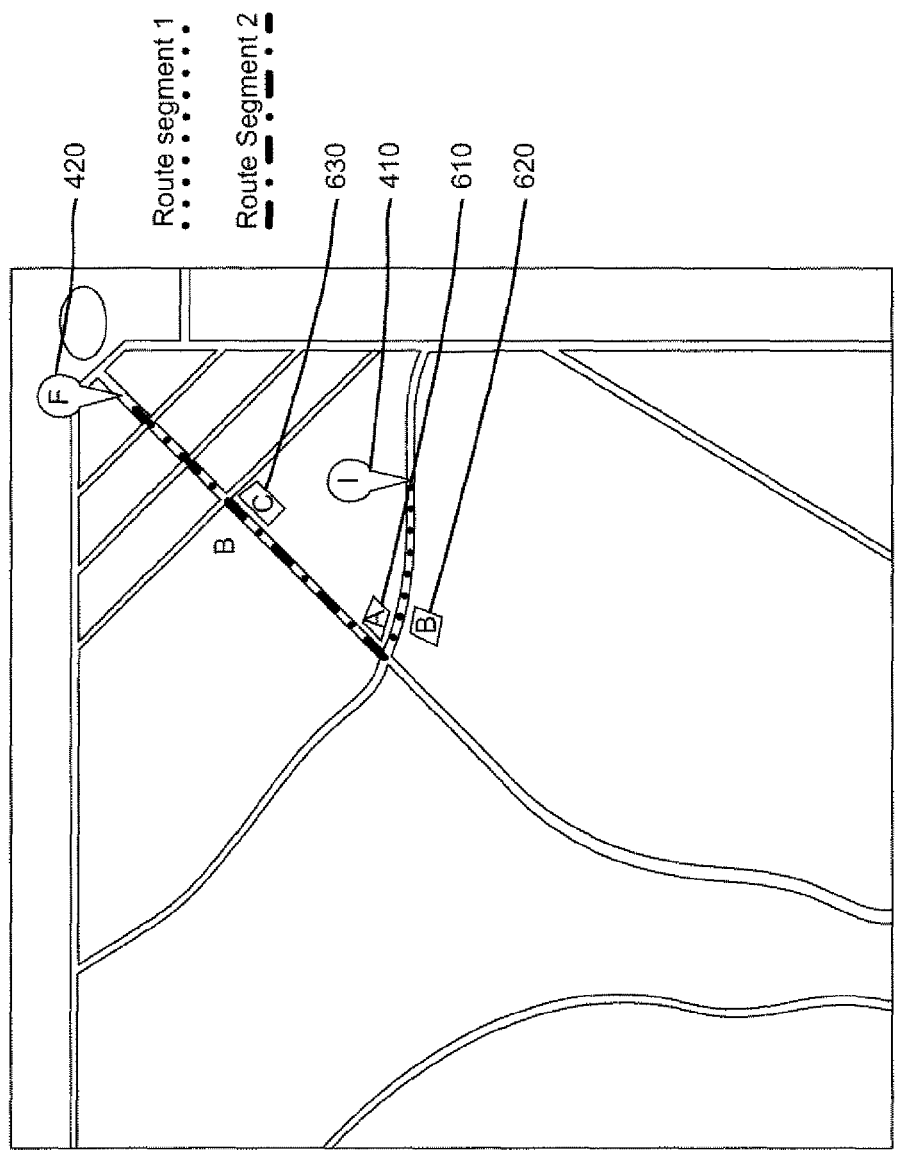
FIG. 6 is a functional diagram of information in accordance with an aspect of the invention.

Turning to FIG. 6, company A 610 and company B 620 may be associated with route segment 1 while company A 610 and company C 630 are associated with route segment 2. Server 110 may receive bids from user A of company A, user B of company B, and user C of company C. As shown in blocks 351-53 of FIG. 3B, each bid may be associated with a placemark, for example, placemarks A, B and C, respectively. Placemarks A, B, and C may identify or represent companies A, B, and C respectively. Bids may include various formats such as a price per display or price per route segment.

Bids may also be associated with additional requirements. For example, a bid may include one or more specific date or time periods when the bid will be active. A business may want to have its placemark displayed to users who will be nearby at a particular time. If the business is a restaurant, for example, the restaurant may want to target users who are going to be passing the business during lunch time. Thus, in the example, the restaurant's bids may be associated with a time period from 11:30 am to 2:00 pm local time, or a time when passers by are likely to be interested in stopping at a restaurant.

In another example, the bid may be associated with time periods corresponding to the operating hours of the business. This prevents the business from being required to also have the system bid on placemarks which will be displayed when the business is less likely to profit from display of the placemark.

Server 110 may determine where the user is likely to be in the future and use this information when selecting bids associated with time periods. For example, where the system is not being used in real time, the server may predict, based on the route selected and the time of the request for turn-by-turn directions, which route segments the user is likely to be traveling along at a particular time. The server may then use the predicted time to select bids when generating the turn-by-turn instructions.

The expected needs of the user (for example, food, fuel, rest stop, or other needs) may be requirements associated with a bid. For example, the server may receive user information from a client device or a user indicating a type of vehicle. The server may use this information to identify the fuel efficiency of the vehicle. The server may also determine a route traveled by the vehicle, either in real time or by estimation in advance, and determine that the vehicle is likely to need additional fuel at or near a particular location. Thus, server 110 may select a bid associated with a gas station over bids of other businesses whether or not the gas station has included such requirements in its bids.

The user may also upload personal preferences or other user information to the server or the server may collect such information if it is publically available. For example, if the user makes his or her calendar available, the system may identify an important date such as a birthday or anniversary either today or at some time (for example 1 day or 1 week) in the future. The server 110 may select bids for businesses such as florists or jewelry stores over other businesses based on such information.

Server 110 may process the received bids and determine that user A is the highest bidder for route segment 1. The server will associate user A's placemark with route segment 1 and charge user A according to user A's bid. Server 110 may also use a Vickrey auction where the winner pays the price of the next highest bid. In another example, the server may conduct a micro-auction as the route segments for a particular request for turn-by-turn directions are identified.

In addition to receiving bids from users, server 110 may receive budget information. Budget information may include the daily, weekly, monthly, etc. budget for a particular user. Each user may pre-set a bidding structure for particular route segments. For example, user A and user B may each have a budget of $5.00 for route segment 1. If A's bids are set to $0.50 and B's bids are set to $0.40, server may determine that A's bid is higher and associate route segment 1 with user A's placemark for that particular request for turn-by-turn directions. Server 110 may subtract $0.40 or $0.50 from user A's budget. When user A's budget is below $0.40, server 110 may determine user A's bid to be less than $0.40 for route segment 1, and server may determine that user B is the highest bidder. Thus, server may conduct the auction without real-time input from users.

In addition to budget and bid information, the server may also use click-through rates. For example, if users often select the displayed placemark or content, the click-through rate may be relatively high. If users rarely select the displayed placemark or content, the click-through rate may be relatively low. The server may select a bid based by valuing each bid based on the click through rate associated with a placemark times the actual bid associated with the placemark.

Figure 7A:
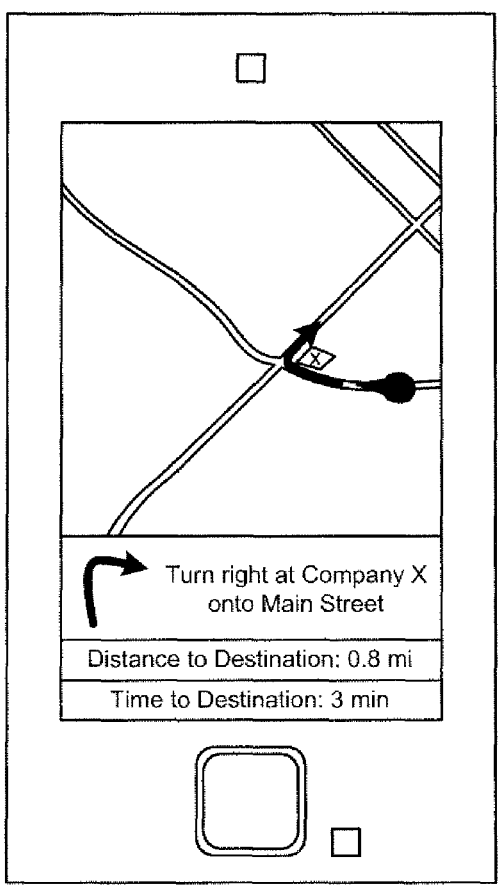
FIGS. 7A and 7B are exemplary screen shots in accordance with an aspect of the system and method.
Figure 7B:
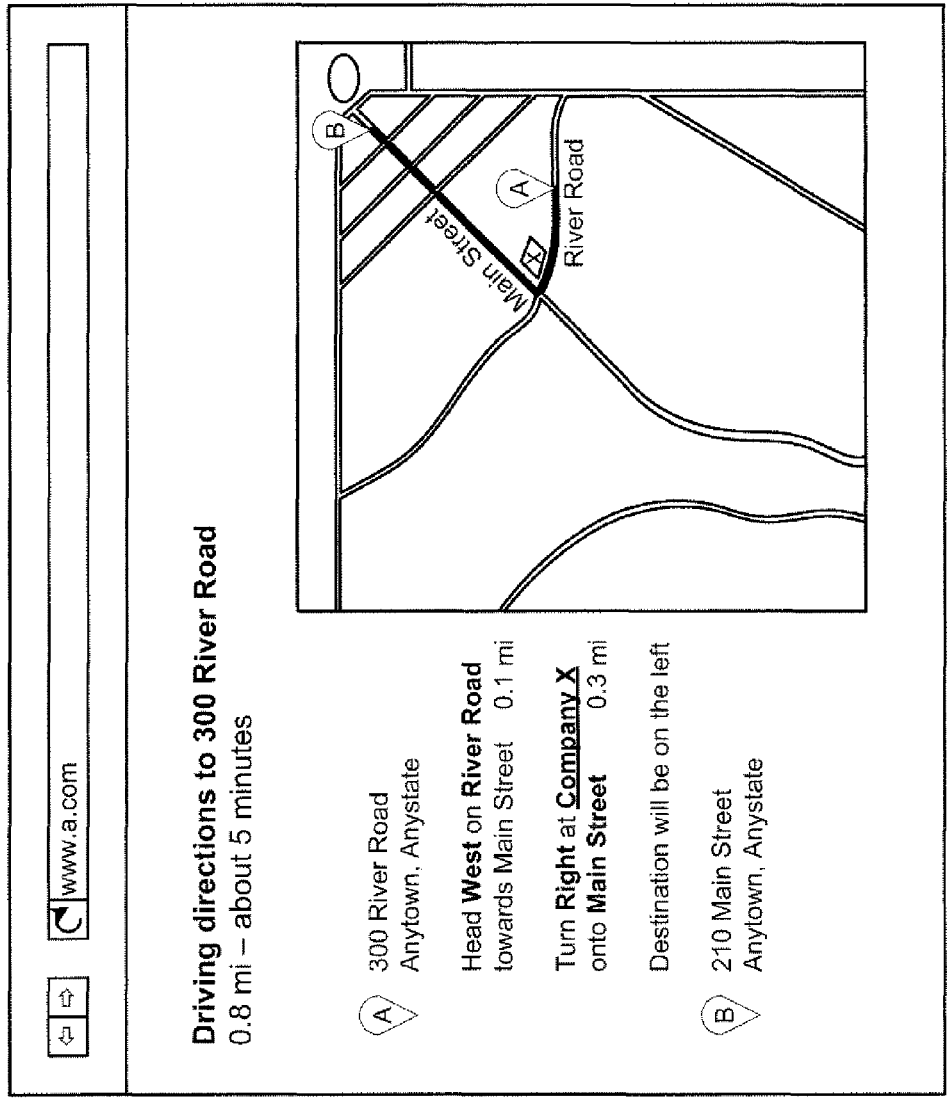

Server 110 uses the auction information to generate a turn-by-turn direction for the route segment. For example, as shown in FIGS. 7A and 7B, server may generate a turn-by-turn direction based on a route segment and the associated placemark selected by the bidding process. For example, user X may be associated with company X. If company X's placemark is selecting by the bidding process, company X's placemark is incorporated into the direction so that user X's business is presented on the client device's display. In addition, the placemark may include links to various URLs. For example, as shown in FIG. 7B, the text "Company X" includes a hyperlink to a network location such as the website for Company X.

In one alternative, as shown in blocks 345 and 380 of FIG. 3b, if there are no placemarks associated with a particular route segment, the server may default to generic turn-by-turn directions. In another alternative, if there are placemarks associated with the particular route segment at block 345, but no bids have been received at block 355, the server may default to generic turn-by-turn directions or other placemarks such as schools, fire stations, post offices, or libraries.

Although the example described above included placemarks located proximate to an intersection, it will be understood that bidding may also include placemarks located along the direction path. A turn-by-turn direction may include an intermediate direction incorporating a placemark, for example, for route segment 2, if user C is the highest bidder, the associated turn-by-turn direction may include text or audio such as "continue north along Main Street, you will pass Company C on the right."

Figure 8:
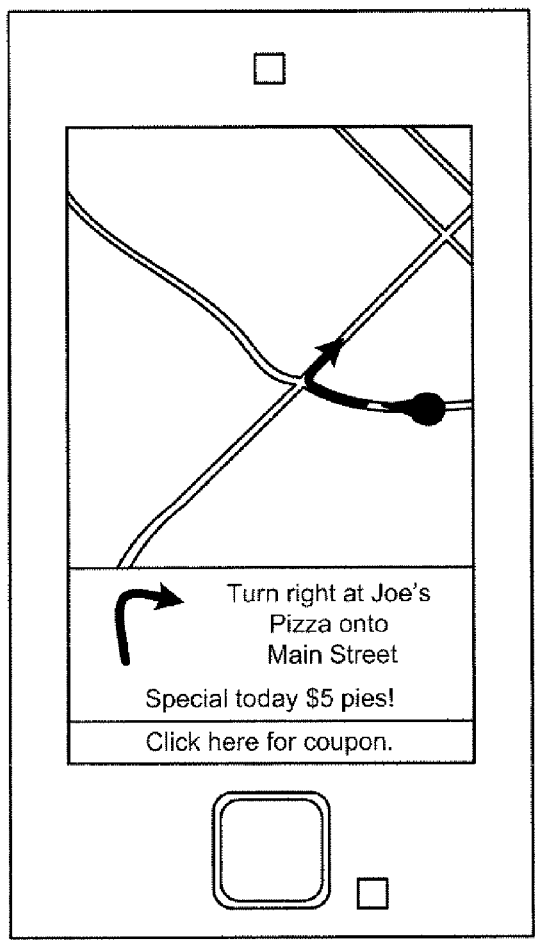
FIG. 8 is an exemplary screen shot in accordance with an aspect of the invention.

In one embodiment, the server may incorporate additional content into the turn-by-turn direction for the route segment. For example, as shown in FIG. 8, server may generate a turn-by-turn direction which includes a link to a coupon. In another example, the turn-by-turn direction may display the actual coupon.

In another embodiment, the server may conduct an action based on the location of the client device. For example, a client device may send GPS coordinates to server 110 periodically as the client device moves along the route. As the user approaches a turn or the next route segment, server may conduct a micro-auction as described above. This method may increase the likelihood that the user will actually pass the placemark and may be more valuable to bidding users.

It will be further understood that the sample values, types and configurations of data described and shown in the figures are for the purposes of illustration only. In that regard, systems and methods in accordance with aspects of the invention may include different web sites, data values, data types and configurations, and may be provided and received at different times (e.g., via different web pages) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of providing turn-by-turn directions to a client device on a network, the method comprising:
   receiving, by a server, a request for turn-by-turn directions, the request including an origin and a destination;
   identifying a route between the origin and the destination, wherein the route is comprised of a plurality of route segments;
   determining a position of the client device along the route;
   identifying a particular route segment of the plurality of route segments;
   receiving a plurality of bids and a plurality of temporal requirements associated with the plurality of bids, wherein each of the plurality of bids is for a respective placemark having a geographic location;
   identifying, based on the geographic location for each placemark, one or more placemarks that are associated with the particular route segment;
   selecting a placemark from the identified one or more placemarks based on the one or more respective bids, the position of the client device along the route, and the associated temporal requirements;
   generating a turn-by-turn direction for the particular route segment, the generated turn-by-turn direction incorporating content associated with the selected placemark; and
   transmitting the turn-by-turn direction to a client device.

2. The method of claim 1, wherein the first location is a current location of the client device.

3. The method of claim 1, wherein identifying a particular route segment includes receiving a current location of the client device.

4. The method of claim 1, wherein each received bid is associated with a user and each user is associated with a budget, the method further comprising:
   identifying a first user associated with the selected placemark; and
   reducing the budget associated with the first user based on at least one of the plurality of received bids.

5. The method of claim 4, wherein the budget is reduced by a highest received bid.

6. The method of claim 4, wherein the budget is reduced by a bid which is less than a highest received bid.

7. The method of claim 1, wherein the selected placemark is associated with a highest received bid.

8. The method of claim 1, wherein the content is a business name.

9. The method of claim 1, wherein the content is a coupon.

10. The method of claim 1, wherein the selected placemark is further associated with a business.

11. The method of claim 1, wherein the temporal requirement associated with the selected placemark is a predefined time period.

12. The method of claim 1, wherein the temporal requirement associated with the selected placemark is a specified day of the week.

13. The method of claim 1, wherein the temporal requirement associated with the selected placemark is based on operating hours of a business associated with the selected placemark.

14. The method of claim 1, wherein the temporal requirement associated with the selected placemark is based on user information received from a user of the client device.

15. The method of claim 14, wherein the user information is calendar information.

16. The method of claim 14, wherein the user information is a type of vehicle and the selected placemark is associated with fuel, the method further including identifying an estimated fuel efficiency and identifying a route segment based on the type of vehicle and estimated fuel efficiency.

17. The method of claim 1, wherein the route between the first location and the second location is associated with an estimated travel time and wherein selection of the placemark is further based on the estimated travel time.

18. A device for providing turn-by-turn directions to a client device over a network, the device comprising:
a processor; and
memory coupled to the processor, the memory including a first part for storing the instructions and a second part for storing turn-by-turn directions; and
the processor being configured to:
receive a request for turn-by-turn directions from an origin to a destination;
identify a route between the origin and the destination, the route being comprised of a plurality of route segments;
determining a position of the client device along the route;
identify a particular route segment of the plurality of route segments;
receive a plurality of bids and a plurality of temporal requirements associated with the plurality of bids, wherein each of the plurality of bids is for a respective placemark having a geographic location;
identify, based on the geographic location for each placemark, one or more placemarks that are associated with the particular route segment;
select a placemark from the identified one or more placemarks based on the one or more respective bids, the position of the client device along the route, and the associated temporal requirements;
generate a turn-by-turn direction for the particular route segment, the generated turn-by-turn direction incorporating the business name of the selected placemark; and
transmit the turn-by-turn direction to a client device.

19. The device of claim 18, wherein the temporal requirement associated with the selected placemark is a predefined time period.

20. The device of claim 18, wherein the temporal requirement associated with the selected placemark is a specified day of the week.

21. The device of claim 18, wherein the temporal requirement associated with the selected placemark is based on operating hours of a business associated with the selected placemark.

22. The device of claim 18, wherein the temporal requirement associated with the selected placemark is based on user information received from a user of the client device.

23. A machine-readable medium comprising instructions stored therein, which when executed by a system, cause the system to perform operations comprising:
receiving, by a server, a request for turn-by-turn directions, the request including an origin and a destination;
identifying a route between the origin and the destination, wherein the route is comprised of a plurality of route segments;
determining a position of the client device along the route;
identifying a particular route segment of the plurality of route segments;
receiving a plurality of bids and a plurality of temporal requirements associated with the plurality of bids, wherein each of the plurality of bids is for a respective placemark having a geographic location;
identifying, based on the geographic location for each placemark, one or more placemarks that are associated with the particular route segment;
selecting a placemark from the identified one or more placemarks based on the one or more respective bids, the position of the client device along the route, and the associated temporal requirements;
generating a turn-by-turn direction for the particular route segment, the generated turn-by-turn direction incorporating associated with the selected placemark; and
transmitting the turn-by-turn direction to a client device.

* * * * *